April 11, 1939.  C. E. FAUST  2,153,864
AUTOMATIC PHONOGRAPH
Filed Dec. 23, 1935  6 Sheets-Sheet 1
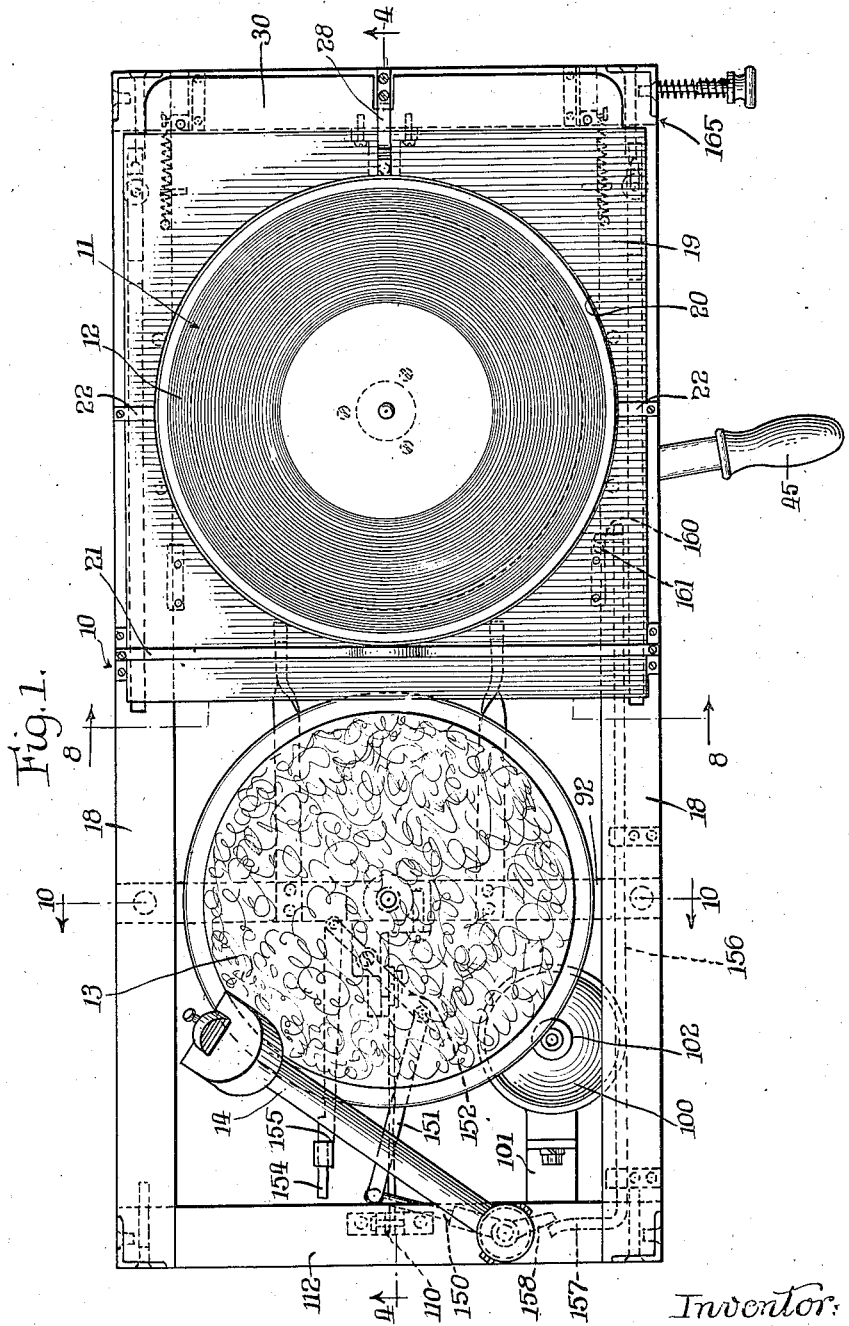
Inventor:
Carl E. Faust,

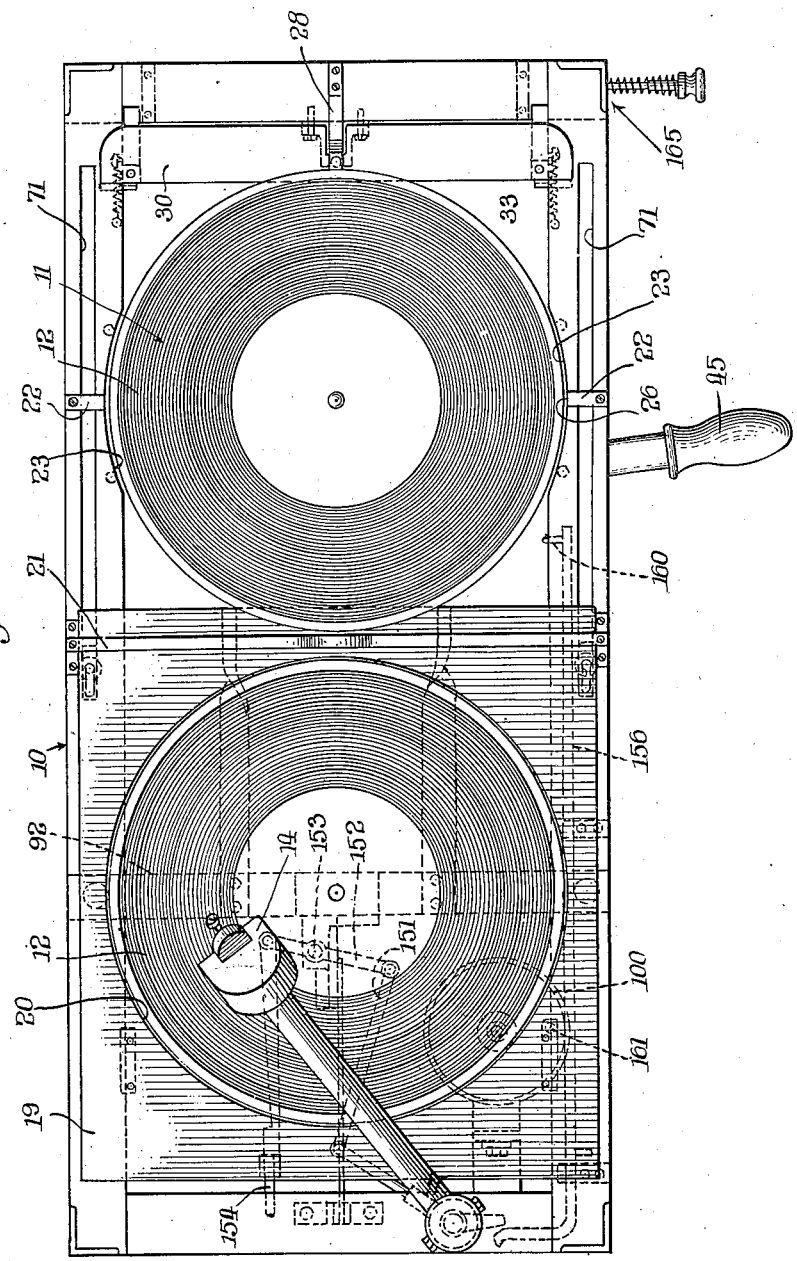

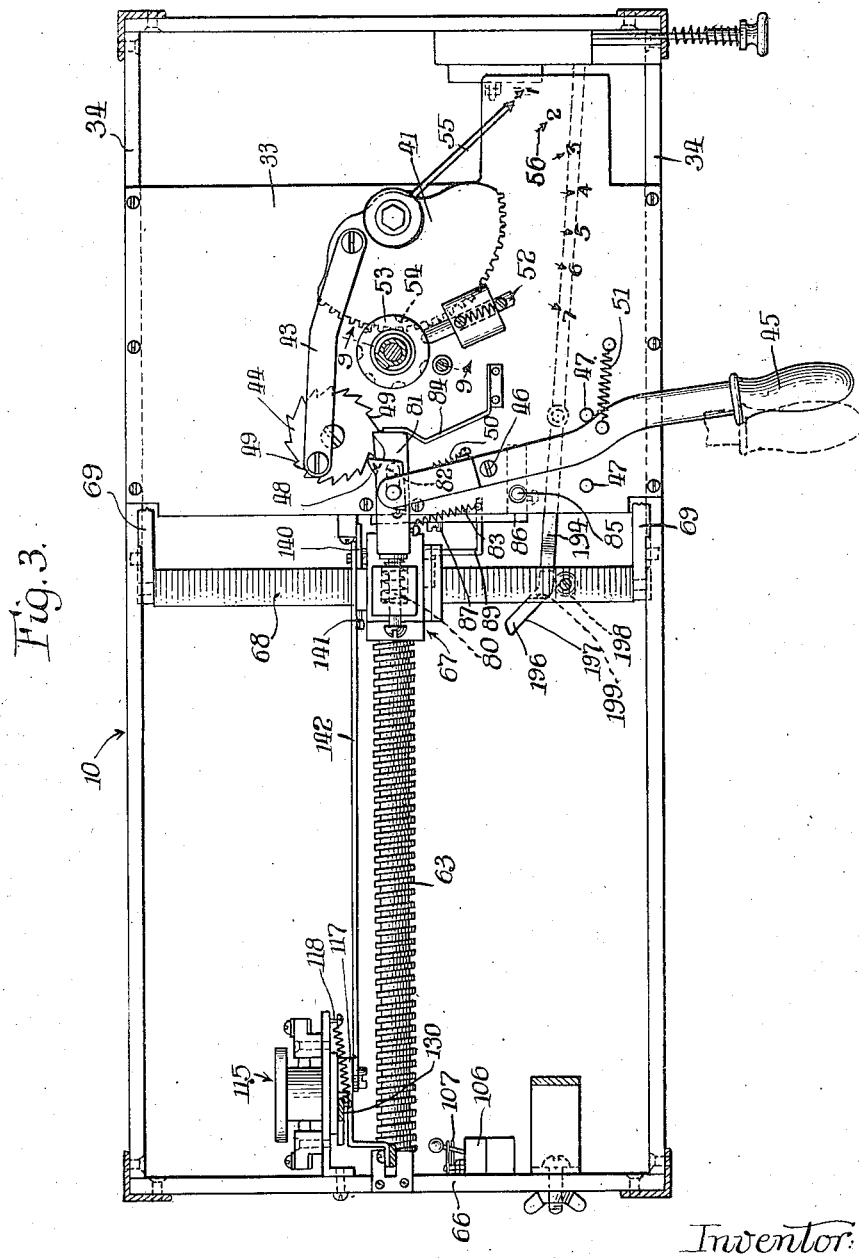

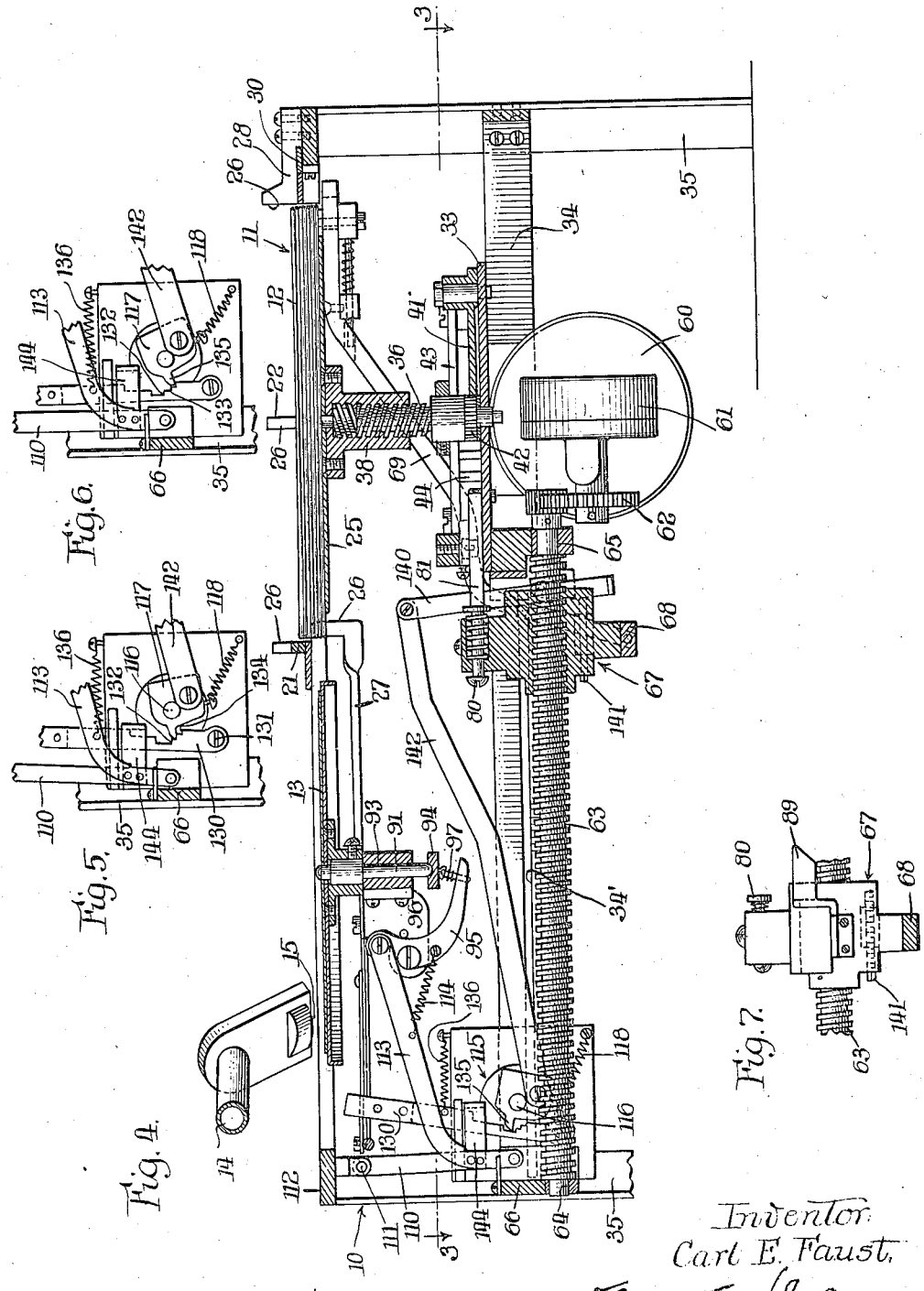

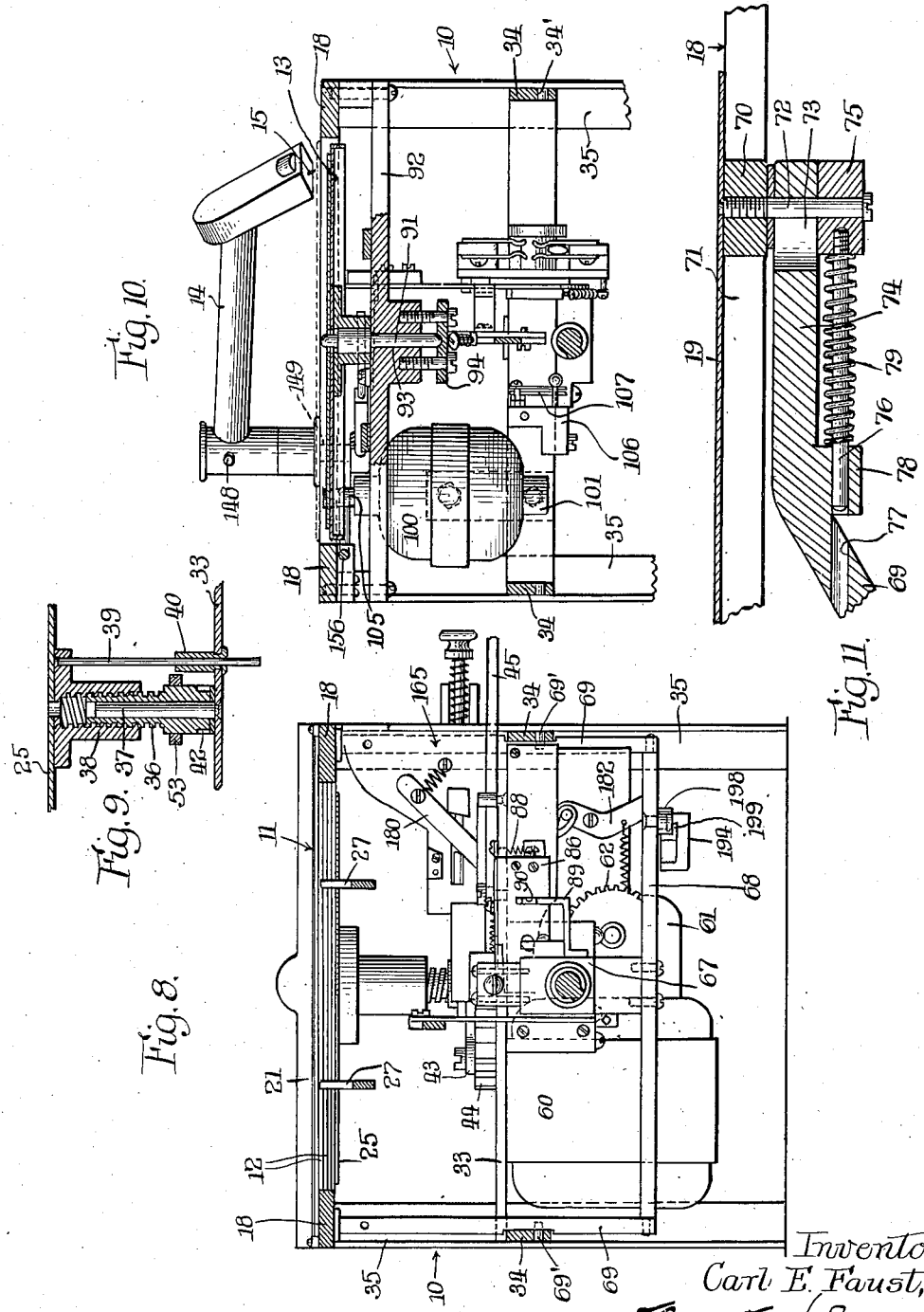

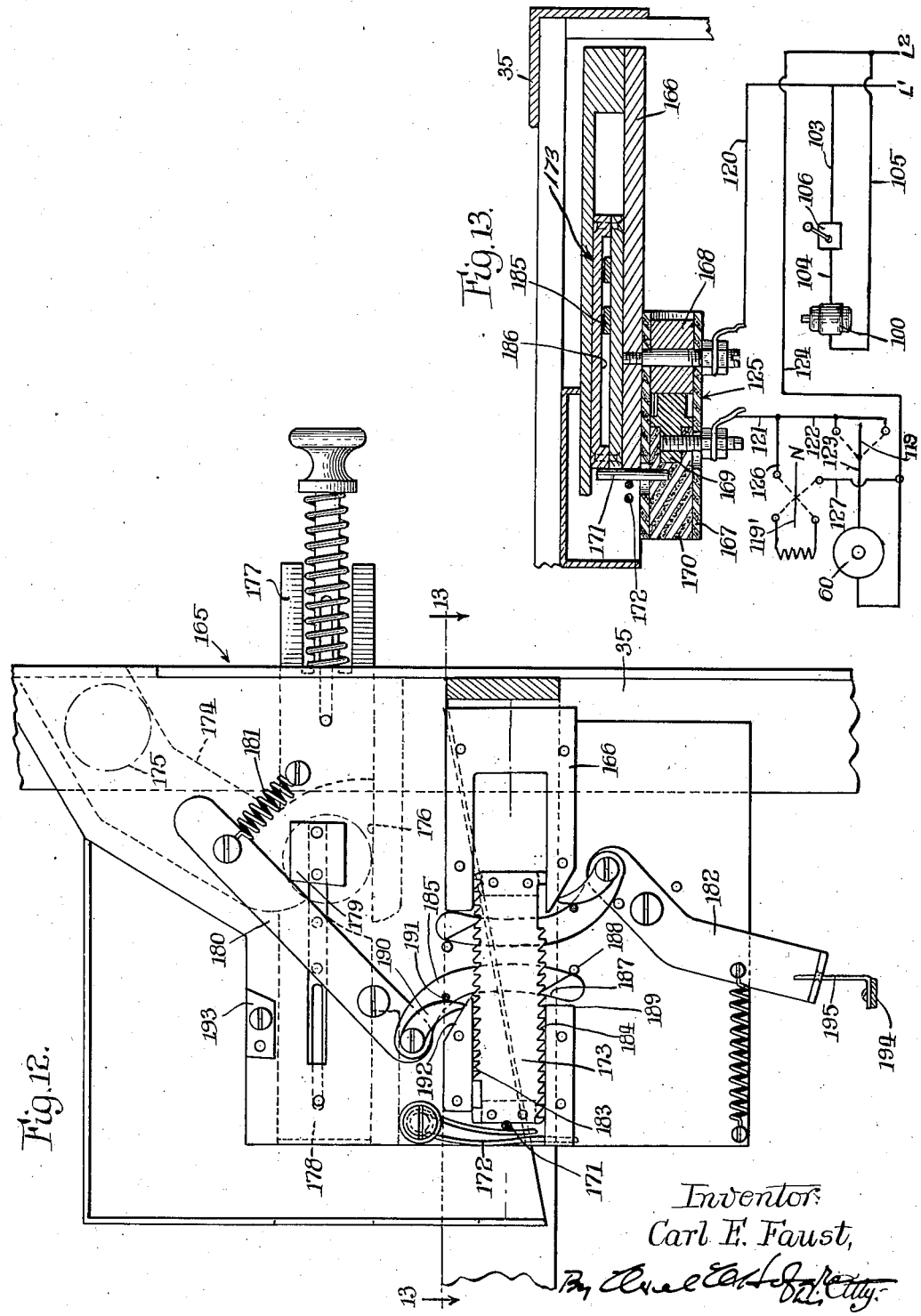

Patented Apr. 11, 1939

2,153,864

UNITED STATES PATENT OFFICE 2,153,864

AUTOMATIC PHONOGRAPH

Carl E. Faust, Chicago, Ill.

Application December 23, 1935, Serial No. 55,750

12 Claims. (Cl. 274—10)

The invention relates generally to phonographs and more particularly to such devices embodying automatic means for changing the records.

An important object of the invention is to provide such a machine which is simple in construction and reliable and rugged in operation.

Another object is to provide such a machine wherein the operative relationship of the tone arm and the selected record is established through elevation of the rotatable record table upwardly toward the suspended and properly positioned tone arm.

A further object is to provide such a machine embodying a novel and advantageous inter-relationship of the various moving elements which results in a material simplification of the device as a whole.

Another object is to provide such a machine having a novel and advantageous record-holding and selecting magazine.

A further object is to provide a machine of this character adapted either for automatic change of the records in a predetermined order of succession, or for manual selection of any one of the records held by the magazine.

Another object is to provide a phonograph of this character having a new, improved and simplified record-transfer mechanism.

A further object is to provide such phonograph wherein the record-transfer mechanism has associated therewith a new and improved electrical means for controlling the operative movements of such mechanism.

Another object is to provide such a phonograph wherein a reversible electric motor is employed to impart the required operating movement to the various elements of the mechanism.

In pursuance of the foregoing objects, I have provided an automatic coin controlled phonograph wherein a record magazine is located beside a vertically shiftable turntable, with transfer means for shifting the records, one at a time, from the magazine to the turntable, and for returning the record to the magazine. Manual selecting means may be used to determine the record to be played, after which the coin controlled device is actuated to close a primary switch to a reversible main motor which, in accordance with the setting of a reversing switch, drives the transfer means in its forward or return movements. The selected record is shifted to a position over the turntable, after which rotation and elevation of the turntable are automatically initiated to lift the record from the transfer means and impart rotation thereto. An overhanging tone arm, which has been positioned during the preceding cycle, engages the record as it is elevated, thereby starting the desired reproduction, and upon completion of the reproduction, reverse drive of the main motor is automatically initiated to lower the turntable and cause return of the record to the magazine by the transfer means. During such reverse operation of the main motor, the tone arm is automatically reset, the reversing switch is reset, and finally, the primary switch is opened to stop the machine.

Other objects and advantages will become apparent from the following description taken in connection with the accompanying drawings, in which:

Fig. 1 is a plan view of an automatic phonograph embodying the features of my invention, the parts being shown in their rest or inoperative positions.

Fig. 2 is a view similar to Fig. 1 with the parts shown in the positions occupied at substantially the end of the reproduction of a selected record, and just prior to the return of the record to the magazine.

Fig. 3 is a plan section taken substantially along the line 3—3 of Fig. 4.

Fig. 4 is a vertical sectional view taken substantially along the line 4—4 of Fig. 1.

Figs. 5 and 6 are fragmental views of the switch control mechanism of Fig. 4 showing different positions of the parts.

Fig. 7 is a fragmental elevational view of a part of the actuating mechanism.

Fig. 8 is a vertical cross-sectional view taken substantially along the line 8—8 of Fig. 1.

Fig. 9 is a sectional view taken along the line 9—9 of Fig. 3.

Fig. 10 is a vertical cross-sectional view taken substantially along the line 10—10 of Fig. 1.

Fig. 11 is an enlarged detail sectional view of a part of the actuating mechanism.

Fig. 12 is an enlarged elevational view of the coin-control device.

Fig. 13 is a wiring diagram showing one of the switches in horizontal section along the line 13—13 of Fig. 12.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

The embodiment of the invention chosen for disclosure is provided with an elongated rectangular supporting frame 10 which carries the various operating and structural elements of the phonograph in such a manner as to be adapted for mounting as a unit in a conventional type of cabinet. At one end of the frame 10 there is provided means constituting a record magazine 11 for supporting, in horizontal planes one above the other, a plurality of flat disk-like records 12, while at the other end of the frame 10 a turntable 13 and an overhanging tone arm 14 are provided for cooperation in reproducing the subject matter of any one of the records 12 which may be selected and transferred from the magazine to the turntable.

Means is provided for automatically transferring the records 12 back and forth between the magazine 11 and the turntable 13, and this means is preferably of such a character that the record selected is maintained in a horizontal plane at all times during its transfer movement, and is returned to its original position in the magazine. In the present embodiment the selected record in its transfer movement is located above the turntable 13, and to establish the desired operative relationship the turntable is elevated from its normal or lower position shown in full lines in Figs. 4 and 10, to its elevated or operative position shown in dotted outline in Fig. 10.

In such movement the record is lifted from the transfer means and is supported on the turntable 13, while the needle 15 in the overhanging tone arm 14 is engaged with the record groove at the proper point. Upon completion of the playing of the record, the turntable 13 is lowered and the record is returned to its position on the transfer means for return to the magazine 11.

In the present embodiment a definite interrelation exists between the particular form of transfer means and the particular form of magazine employed, the transfer means being arranged to shift the records along a single horizontal plane while the magazine is constructed to provide for vertical shifting of the records in the magazine so as to bring any selected one of the records into operative relationship with the transfer means.

Thus as shown in Figs, 1, 2, 4, 8 and 10, the transfer means includes a pair of longitudinal rails 18 extending along the front and rear of the frame 10, and constituting part of the frame, the rails 18 being so spaced that the front and rear edges of a record 12 may rest on and slide along the rails from the magazine to a position overlying the turntable 13. With this spacing of the rails 18, the turntable is constructed of a less diameter than the records 12 so that it may move upwardly between the rails into operative supporting relation to a record. To shift the selected record along the rails 18, a transfer plate 19 of the same thickness as a record is provided, the plate having a circular opening 20 therein of a diameter adapted to receive a record. The plate 19 is mounted on the top of rails 18 and is guided for longitudinal sliding movement therealong by an overlying guide bar 21 and by overlying lugs 22 fixed to the rails 18.

To permit vertical shifting of the records in the magazine the rails 18 are suitably cut away as at 23 (Fig. 2), and when a particular record is selected for transfer, it is, by vertical shifting of all of the records, positioned in the plane of the transfer plate 19.

In the form illustrated the records 12 normally rest one upon the other in a stack as shown in Fig. 4, this stack being carried upon a vertically shiftable supporting member 25. The member 25 is of plate-like form, and the records are guided and held in proper horizontal position by a plurality of vertically extending guide surfaces 26 formed on the bar 21, the lugs 22 and on supplemental guide fingers 27 and 28.

When the transfer plate 19 is in its right hand position of Figs. 1 and 4, with its opening 20 concentric with the magazine, the support member 25 may be shifted to bring the desired record into position in the opening 20, and upon movement of the transfer plate 19 to the left the selected record is shifted onto the rails 18 and between the guide bar and the upper ends of fingers 27 toward the turntable 13. As this shifting takes place a spring pressed spacer plate 30, mounted in the plane of the transfer plate at the right hand end of the frame (Figs. 1, 2 and 4) is shifted to the left by springs 31 to the position shown in Fig. 2. In this position the spacer plate 30 maintains the vertical space left between the records 12 by the removal of the selected record, while the right end of the transfer plate maintains the spacing at the left hand edge of the record stack. It follows therefore that the selected record is invariably returned to its original position in the magazine.

Beneath the record magazine 11 a platform 33 is provided to carry the record-supporting member 25 of the magazine, the platform at its front and rear edges being fixed to horizontal beams 34 extending lengthwise of the frame between end columns 35 thereof. On the platform 33 is mounted means for supporting and shifting the member 25. This means preferably comprises a screw 36 (Fig. 9) journaled on a fixed vertical bearing pin 37 coaxially of the magazine and engaging an internal thread formed in a hub 38 fixed to the bottom of member 25. A rod 39 depending eccentrically from the member 25 and slidably engaging a bearing sleeve 40 (Fig. 9) on the platform prevents rotation of the member 25 so that rotation of the screw 36 results in vertical movement of the member 25.

To impart the desired rotation to the screw 36 a segmental gear 41 (Figs. 3 and 4) is mounted on a vertical axis on the platform 33 with its teeth engaging a suitable pinion 42 formed on the lower end of screw 36. A link 43 pivoted at one end to the segment 41 has at its other end a crank-like connection with a ratchet wheel 44, the wheel 44 being rotatably mounted on the platform 33 so that in a full rotation of the wheel 44 the segment is rocked back and forth through a range sufficient to reciprocate the record-supporting member through its entire range.

A manual actuating means, preferably in the form of a hand lever 45, is provided for actuating the record selecting mechanism just described. The lever 45, when the plate 19 is in its right hand position, may be rocked about a vertical pivot 46 on the platform 33 between stops 47, and in such rocking movement a pawl 48 on the lever 45 engages ratchet teeth 49 to impart a step by step movement to the wheel 44 and the associated parts. By making the teeth 49 of different arcuate lengths, as shown in Fig. 3, the mechanism is such that each movement of the handle or lever 45 shifts the records 12 through a distance equal to the thickness of one record. The pawl 48 is urged toward the teeth 49 by a spring 50, while the handle is returned to its full line position of Fig. 3 by a spring 51. To retain the screw in its various rotative positions a spring plunger 52 is urged into engagement with the periphery of a disk 53 in which periphery a plurality of properly spaced recesses 54 are formed as shown in Fig. 3. Preferably means is provided to indicate which of the records is in operative relation to the transfer plate 19, and in the present embodiment this means comprises a pointer 55 fixed to the segment 41 and cooperating with an indicating scale 56 on the platform 33.

To provide particularly for the reciprocation of the transfer plate 19, actuating means is provided, and this means in its movement of the transfer plate 19 is preferably utilized to cause actuation of various control elements to produce an automatic cycle of operation. This actuating means preferably comprises a reversible motor 60 suspended beneath platform 33 and acting through reduction gearing 61 and 62 to rotate a screw 63. Opposite ends of the screw 63 are journaled in bearings 64 and 65 carried by the platform 33 and a transverse bar 66 at the left end of the frame as shown in Fig. 3. In this mounting the screw 63 is parallel to the path of movement of the transfer plate 19, and by rotation of the screw 63 a non-rotatable nut 67 may be reciprocated through a range slightly greater than the range of the plate 19.

From the bottom of the nut 67 a draw bar 68 extends in opposite directions, and at opposite ends of the bar, adjacent to the front and rear of the frame, links 69 are pivoted. The links 69 extend angularly upwardly and to the right as shown in Fig. 4 for connection at their other ends to the transfer plate 19. To facilitate proper operation of the actuating mechanism, the links 69 may have outwardly projecting bearing pins 69' riding in longitudinal guide slots 34' in the beams 34. Preferably the connection to the plate 19 takes the form of a spring pressed lost motion connection such as that shown in Fig. 11. In this form a guide block 70 extends downwardly from the plate 19 through a longitudinal guide slot 71 in the rail 18 and from the block 70 a pin 72 projects through a slot 73 in the horizontal upper end 74 of the link 69. Beneath the end 74 the pin 72 carries a head 75 from which a horizontal pin 76 extends slidably into a bore 77 in a downwardly extending lug 78 formed on the link. About the pin and between the head 75 and the lug 78 is an expansive coil spring 79 acting to press the transfer plate 19 toward the right with respect to the link 19.

This lost motion connection permits the nut 67 to continue to move to the right after the movement of the transfer plate 19 has been stopped by abutment of the spacer plate 30 with the throat provided by the right hand guide lug 28 (Figs. 1, 2 and 4), and by reason of such lost motion the additional movement of the nut 67 and the associated parts is rendered available for the performance of various control functions as will be hereinafter explained.

One such control function of the actuating mechanism is the automatic changing of the record at the end of each record-playing cycle. In accomplishing this operation a resiliently mounted plunger 80 on the top of nut 67 acts during such lost motion (to the right) to engage a pawl 81 (Figs. 3 and 4). The pawl 81 has a longitudinally extending pin and slot mounting 82 on the platform 33 beneath the pawl 48, and is urged to contact the ratchet wheel 44 by a coil spring 83, while a leaf spring 84 urges the pawl to the left in Fig. 3. Thus when the plunger 80 presses the pawl 81 to the right as in Fig. 3, the ratchet wheel 44 is actuated to shift the record-supporting member 25 through a distance sufficient to place a different record in operative relation to the transfer plate 19.

Another control function accomplished by the nut 67 during its lost motion to the right at the end of the playing cycle is that of conditioning the magazine mechanism to permit manual selection of the succeeding record. The manual selecting mechanism, being actuated by pivoting of the hand lever 45 to the left in Fig. 3, is normally disabled by a stop pin 85, the pin being carried on the shiftable end of a lever 86 pivoted at 87 on the left hand edge (Fig. 3) of the platform 33. A spring 88 (Fig. 8) acts normally on the lever 86 to project the pin 85 upwardly through a suitable bore in the platform 33 into the path of rocking movement of the hand lever 45 to prevent material actuation thereof. To lower the stop pin 85, a cam bar 89 projects from the nut 67 as shown in Figs. 7 and 8, and during the lost motion of the nut to the right the cam bar passes through a hole 90 in the lever 86 whereby the lever is swung downwardly and the manual selecting mechanism is freed for operation. Upon release of the lever 86 in the succeeding advance or left hand movement of the nut 67, the stop pin 86 returns to its effective position.

Elevation and lowering of the turntable 13 also take place in timed relation to the movement of the nut 67, and to obtain this relationship the turntable has a depending central spindle 91 (Fig. 10) journaled for vertical sliding movement in a transverse beam 92 which is suspended beneath front and rear rails 18 as shown in Figs. 1, 4 and 10. The spindle 91 projects downwardly through an elongated bearing 93 and its rounded lower end rests in a suitable depression formed in a bearing plate 94. Downwardly projecting bolts on opposite sides of the spindle guide the plate 94 and hold the same in position, while a bell crank lever 95, pivoted on a lug 96 secured to beam 92, has a spring plunger 97 at one end of the lever 95 engaging the bottom of plate 94, so that rocking movement of lever 95 serves to raise and lower the turntable 13.

To drive the turntable 13 a motor 100 is supported by a bracket 101 with a friction spindle or surface 102 on its upwardly projecting motor shaft, and this friction spindle 102 contacts the periphery of the turntable 13 as shown in Figs. 1, 2 and 10 so as to drive the turntable at the desired speed.

Power for the motor 100 is supplied from lines $L^1$ and $L^2$ (Fig. 13) by wires 103, 104 and 105 which form a circuit including a toggle type switch 106. The switch 106 is mounted on bar 66 of the frame (Figs. 3 and 10) with its arm in the path of the nut 67. A spring 107 normally urges the switch 106 to the open position of Fig. 3, while the positioning of the switch is such as to insure operation of the motor 100 during elevation and lowering of the turntable.

Such shifting of the turntable 13 is preferably effected by a lever system, actuated by the nut 67 in its movement to the left, and operatively connected to the bell crank 95. Thus a lever 110 is suspended from a pivot 111 on the upper end member 112 of the frame 10, so that the lower end of the lever 110 lies in the path of the nut 67. Between the lower end of the lever 110 and the other end of bell crank lever 95 a link 113 is connected so that shifting of lever 110 by the nut 67 in its movement to the left acts to raise the turntable, while retraction of the nut to the right permits the table to descend to its lower position. Such descent is aided by a spring 114 acting between the lower end of lever 95 and the link 113.

Through the actuation of the lever 110, the nut 67 also effects one of the controlling functions upon the reversible actuating motor 60. This controlling function is exercised through a reversing switch 115 (Figs. 3, 4, 10 and 13) which is mounted on the bar 66 adjacent to the lever 110. The switch 115 has a rocking movement on a rock shaft 116 (Figs. 4, 5 and 6), and an actuating member 117 on one end of the shaft 116 is normally biased by a spring 118 to move the switch from the forward position of Fig. 4 through the neutral position of Fig. 5 and to the reverse position of Fig. 6. In the forward position of Fig. 4 the switch 115 is connected to cause drive of the nut 67 to the left in Fig. 4. The switch 115 is shown diagrammatically in Fig. 13, and has, as indicated, a switch arm 119 mechanically interconnected with the field-reversing arm 119′ so as to break the circuit to the armature when the field circuit is broken. Wires 120, 121, 122, 123 and 124 connect the armature of the motor 60 to the lines $L^1$ and $L^2$, the switch arm 119 being interposed between wires 122 and 123, while a starting switch 125 is interposed between wires 120 and 121. Across the lines 122 and 123 the field of the motor and its reversing switch 115 and arm 119′ are shunted by wires 126 and 127.

To control the position of the reversing switch 115 the movements of the nut 67 and of the tone arm 14 are utilized through means which includes a stop member 130 (Figs. 4 to 6) pivoted at 131 on the switch plate and having stop shoulders 132, 133 and 134 adapted for engagement by a tooth 135 on the switch actuating member 117. The stop member 130 is normally urged toward the tooth 135 by a spring 136. Assuming the switch to be in the reverse position of Fig. 6, the right hand or return movement of the nut 67 acts to rock the switch actuating member 117 through operative shifting contact with the lower end of a lever 140 pivoted intermediate its ends on the left hand side of the platform 33. An adjustable screw 141 on the nut 67 (Fig. 4) serves to engage the lever 140. From the upper end of the lever 140 a link 142 extends to a pivoted connection with the lower portion of the switch actuating member 117, whereby the rocking of lever 140 shifts the switch actuating member to reverse the switch 115 to the position indicated in Fig. 4.

Due to its bias to the right by spring 136, the stop member 130 shifts during the reversal of the switch so that tooth 135 engages stop shoulder 132 and the switch is retained in its forward position of Fig. 4 until released by appropriate shifting of stop member 130. Such shifting takes place automatically at the end of the left hand movement of the nut 67, this action being effected by a hook member 144 projecting to the right from the lever 110 as shown in Figs. 4 to 6. Thus when the lever 110 is rocked to the left from the position of Fig. 4 to the position of Fig. 5, the stop member is shifted to the position of Fig. 5, and the switch 115 rotates to its neutral position as determined by the engagement of tooth 135 with stop shoulder. 133.

This action serves to break the circuit to motor 60 and the actuating mechanism is stopped pending further movement of the stop member 130 to the position of Fig. 6, at which time the switch 115 rotates to the position (Fig. 6) determined by engagement of the tooth 135 with shoulder 134, so that reverse or right hand movement of the nut 67 is initiated.

Such initiation of the return cycle preferably takes place under the control of the tone arm 14 as it reaches the inner extremity of the record groove. In accomplishing this end the tone arm 14, having its usual horizontal pivot 148, has a mounting on the end rail 112 which provides for swinging about a vertical axis and has a central shaft 149 projecting downwardly through the rail 112 for operative connection with the stop member 130. As shown in Figs. 1 and 2, an arm 150 projects radially therefrom so that in the travel of the tone arm inwardly of the record the end of the arm 150 is moved toward the right as will be evident in a comparison of Figs. 1 and 2. From the end of the arm 150 a link 151 extends to the right and is connected to one end of a lever 152, which lever is pivoted intermediate its ends on a lug 153 fixed to the beam 92. To the other end of lever 152 one end of a link 154 is pivoted, while the other end of the link 154 extends through a slot in the upper end of stop member 130. Thus when the tone arm reaches the position of Fig. 2, a shoulder 155 on the link 154 engages the stop member 130 to shift the same to its position of Fig. 6 and thereby initiate the return cycle of the mechanism.

During the return cycle of the machine the tone arm 14 is returned to its initial position of Fig. 1 by means of a slide bar 156 suspended beneath the adjacent rail 18, the bar having an arm 157 at one end engageable with a radial arm 158 on the shaft 149, and having a projecting pin 160 at its other end lying in the path of a lug 161 depending from the transfer plate 19. Thus the lug 161 strikes the pin 160 during the terminal portion of the return movement of the transfer plate 19, and the slide bar 156 is shifted from the position of Fig. 2 to that of Fig. 1, with the result that the tone arm 14 is returned to its position of Fig. 1, and is thereby conditioned for the succeeding cycle of operation.

To stop the transfer plate and its actuating mechanism in the returned or right hand position of Fig. 1, means is provided for opening the switch 125 at the end of such return movement. The present machine provides for the control of the actuation or closing of the starting switch 125 by a coin control device 165, and therefore the stopping means is inter-related to the coin control device. As shown in Fig. 1, the coin control device 165 is mounted at the right end of the frame 10 and carries the switch 125 on one side of a guideway 166. The switch 125 preferably comprises an insulating sleeve 167 (Fig. 13) having one metallic switch contact 168 fixed therein and a second switch contact 169 carried in the sleeve by an insulating block 170 for sliding movement between open and closed positions. A pin 171 fixed in the block 170 and projecting through a slot in the sleeve 167 is engaged by a spring 172 to urge the switch contact 169 toward its closed position. To effect the desired control of the switch 125 a slide bar 173 (Figs. 12 and 13) is mounted in the guideway 166 to oppose the spring 172 so as to open the switch, and the position of the bar 173 is controlled jointly by the record-transfer mechanism and the actuation of the coin slot device 165.

Thus the coin slot device 165 provides a gravity chute 174 down which a coin 175 may descend onto a supporting ledge 176, for rearward movement by manual inward actuation of a normally projected actuating plunger 177. In such movement the coin is pressed rearwardly against a slide 178 so as to move the slide 178 to the left (Fig. 12) a substantial distance before the coin is cammed downwardly and discharged past the end of ledge 176. Such actuation of the slide 178 operates through a contact block 179 to rock the upper end of a lever 180 against the force of a spring 181.

The lever 180, and a similar spring biased lever 182 located beneath the slide bar 173 cooperate in controlling the position of the bar 173 and thereby controlling the switch 125. In attaining such control of bar 173, the bar is provided along its upper edge with ratchet teeth 183 having vertical sides facing to the left, and with oppositely facing teeth 184 along its lower edge. On the lower end of lever 180 an arcuate link 185 is pivoted, the link extending downwardly through a slot 186 (Fig. 13) in the slide bar 173. At its lower end the link carries a locking tooth 187 adapted to engage between the teeth 184 (Fig. 12) to prevent movement of the slide bar to the right, the lower end of the link being guided between a pin 188 and a surface 189 formed on the guideway. The action of spring 181, acts, of course, to maintain the locking tooth 187 normally in its effective position.

On the lower end of lever 180 an actuating pawl 190 is pivoted with a spring 191 normally urging its lower end against a surface 192 of the guideway. When the lever 180 is rocked by insertion of a coin in the device 165, the pawl 190 slides off of the surface 192 to engage one of the teeth 183 and shift the slide bar to the right for a distance equal to the tooth spacing, a stop 193 limiting the arc of movement of lever 180. During such operation it will be noted that the locking tooth 187 is shifted to an unlocked position.

The lever 182 has a similar but reversely positioned actuating mechanism for the slide bar 173 whereby rocking of lever 182 acts to shift the bar 173 to the left, and it will be evident that during actuation of either lever, the locking tooth 187 of the other lever cams over the adjacent tooth and restrains the bar against undesired shifting.

Thus a user may actuate the coin slot device 165 several times, so as to move the slide bar 173 several steps to the right, and thus the switch 125 will remain closed and the playing cycle of the machine will be repeated until the slide bar has been returned a corresponding number of steps to the left by successive rocking movements of the lever 182. To impart such a rocking movement to the lever 182 at the end of each right hand movement of the transfer mechanism, a lever 194 (Figs. 3, 8 and 12) is pivoted intermediate its ends on a vertical axis beneath the platform 33, and at one end of the lever 194 is an upstanding spring 195 (Fig. 12) extending through a slot in the bent lower end of the lever 182. At its other end the lever 194 has a bent end portion 196 providing a cam surface 197 adapted for engagement by a roller 198 located on the lower surface of the draw bar 68. At the right hand end of cam surface 197 is a transverse slot 199 so that the lever 194 is released for return movement (counter-clockwise in Fig. 3) as soon as the lever 182 has been fully actuated. Thus the coin slot device 165 is freed for insertion and actuation by another coin. In the succeeding advance of the draw bar 68 to the left the end 196 of the lever 194 is cammed slightly in a clockwise direction by the roller 198, but such movement is ineffective upon the lever 182 by reason of the resilient connection provided by the spring 195.

In the normal operation of the phonograph the user actuates the selecting lever 45 until the pointer 55 indicates the record desired. By this operation the stack of records is shifted vertically by the supporting member 25 until the desired record is located in the plane of the transfer plate 19 and is within the opening 20 of the plate. The parts are then in the positions shown in Figs. 1, 3 and 4. The coin control device 165 is then actuated to cause closing of the switch 125, and since the reversing switch 115 is in the forward position of Fig. 4, the main motor 60 is started to drive the nut 67 to the left.

As the nut advances to take up the lost motion in the connection between links 69 and the plate 19, the lever 86 is released by its control cam 89 so that the stop pin 85 is projected upwardly to a position which prevents operation of the selecting lever 45. Movement of the transfer plate then slides the selected record to the left from its position in the record stack, the spaced guide faces 26 serving to prevent shifting of the other records. Trailing the plate 19, the spacer plate 30 shifts into the right hand portion of the space between the records, while the trailing edge of the plate 19 preserves the vertical spacing at the other side of the stack.

In this shifting by the plate 19, the record moves onto and along guide rails 18 until it is located directly above the lowered turntable 13. In the terminal portion of its movement the nut 67 closes the switch 106 and starts the motor 100, and also strikes the lever 110 which acts to elevate the turntable and finally to release the reversing switch for movement to the neutral position of Fig. 5. Thus the main motor 60 is stopped, and the record is rotated and lifted into operative relation to the tone arm 14, which has been positioned in the preceding cycle by the slide bar 156.

As the playing of the record is completed, the inward movement of the tone arm to the position of Fig. 2 acts through the link and lever system 151, 152, 154 and 130 to release the switch 115 for movement to its reverse position of Fig. 6, thereby starting the motor 60 to move the nut 67 to the right. This causes the turntable 13 to be lowered, the motor 100 to be stopped, and the record 12 to be shifted along the rails 18 by the plate 19 to its original position in the stack of records in the magazine.

After the plate 19 has reached the right hand extent of its movement, the nut 67 continues to move, such movement being permitted by the lost motion connection of Fig. 11, and during this lost motion the stop pin 85 is lowered to condition the manual selecting means for operation. The pawl 81 is also actuated so as to change the vertical setting of the supporting member 25 and thereby insure the playing of a different record in the succeeding cycle in the event that the manual selector is not employed.

The nut 67 then actuates the lever 140 to reset the switch 115 in its forward position of Fig. 4, and the lever 194 is rocked so as to open the switch 125 and thus stop the machine. In case additional coins have been placed in the coin slot so as to shift the control bar 173 more than one tooth to the right, the actuation of the lever 194 acts merely to step the bar 173 one unit to the left, and the playing cycle is repeated until the lever 194 has been rocked a number of times corresponding to the number of coins deposited.

I claim as my invention:

1. In an automatic phonograph, the combination of a record magazine having means to support a plurality of records in horizontal positions one above the other, a turntable mounted at one side of said magazine for axial vertical shifting movement, means for raising and lowering said turntable, a tone arm adapted to operatively engage a record as it is carried upwardly on said turntable, driving means for rotating said turntable, record transfer means including a record engaging member and a driven element reciprocable horizontally, said driven element having a lost motion connection to said member, and said transfer means being operable in a loading movement in one direction to shift a selected record from the magazine to a position over said turntable and in an unloading movement in the opposite direction to return the record to said magazine, means for reciprocating said transfer means including a control device positioned in the path of said element controlled by said element to stop said transfer means at the end of each loading and unloading movement, manual control means for initiating the loading movement, and means controlled by said tone arm for initiating the unloading movement, and means operated by said element to initially position said tone arm, to raise and lower said turntable and control rotation of said turntable.

2. In an automatic phonograph, the combination of a record magazine having means to support a stack of records in horizontal positions one upon the other, a turntable mounted at one side of said magazine for axial vertical movement, means for raising and lowering said table, a tone arm operable to engage a record carried upwardly on said turntable, driving means for rotating said turntable, record transfer means including a single element reciprocable horizontally, said transfer means through said element being operable in a loading movement in one direction to engage and shift any selected one of said records from the magazine to a position over said turntable and in an unloading movement in the opposite direction to return the record to said magazine, means for reciprocating said transfer means operable to stop said transfer means at the end of each loading and unloading movement, manual control means for initiating the loading movement, means controlled by said tone arm for initiating the unloading movement, and means operated in timed relation to the reciprocating movements of said transfer means to initially position said tone arm, to raise and lower said turntable and control rotation of said turntable.

3. An automatic phonograph comprising, in combination, a vertically movable turntable, a record magazine, said magazine comprising a flat, horizontally positioned supporting member mounted for vertical movement, said member being adapted to have a plurality of records rest in a stack thereon, means operable to shift said member up and down with a step by step movement, each step being equal to the thickness of a record, transfer means operable to remove a record horizontally from said stack at a predetermined level and to transfer such a record to a position over said turntable, and means operable to elevate said turntable into operative relation to such a record, said transfer means being operable to return such a record to its original position in the stack of records.

4. In an automatic phonograph, a record magazine comprising a vertically movable supporting member adapted to carry thereon a stack of records resting horizontally one upon another, a pair of parallel horizontal rails spaced laterally apart a distance slightly less than the width of a record, said rails being formed adjacent said support to permit vertical shifting of the records by said support to aline the bottom surface of any selected one of said records of said stack with the top surface of said rails, means to engage the record thus selected and alined to move it from its position in or on top of said stack and onto said rails and to guide and shift the record to a position beyond the edge of said stack, and a turntable mounted for movement between said rails from an inactive position beneath the rails to an active position above the rails, and operable in such movement to operatively engage and raise the selected record from said rails.

5. A phonograph comprising, in combination, a vertically shiftable turntable, a stationary slideway upon which a record may be supported and guided to a position over said turntable, a record magazine adapted to contain a plurality of records resting horizontally one upon another for movement therefrom onto said slideway, means operable to shift the records in the magazine relative to said slideway and thereby locate a selected record in position to be moved onto said slideway. means operable to engage the selected record and move the same from said predetermined position onto and along said slideway to said position over the turntable, and for returning said record to said magazine.

6. A phonograph comprising, in combination, a frame, a record magazine and a vertically shiftable turntable located at horizontally spaced points on said frame, a tone arm suspended over said turntable, a guideway onto and along which a record may be shifted between said magazine and said turntable, a reciprocable carriage directly engageable with a record to shift the same back and forth along said guideway, means for shifting said records vertically in said magazine to select the one to be moved to said turntable by said carriage, and means for elevating said turntable to raise the record from said guideway and into operative relationship with said tone arm.

7. In an automatic phonograph, the combination of a power driven turntable, a movable tone arm, a record magazine adapted to contain a plurality of records, record-transfer means operable to shift any selected one of said records to said turntable and to return the same to said magazine, a reversible electric motor for driving said transfer means, switch means for controlling the starting, stopping and direction of said motor, and controls for said switch means actuated in part by said tone arm and in part by said transfer means in their movements.

8. In an automatic phonograph, the combination of a power driven turntable, a record magazine, record transfer means operable to transfer any selected record from the magazine to the turntable and to return the same, a tone arm mounted for cooperation with a record supported on said turntable, a reversible motor operatively connected to drive said transfer means in opposite directions by operation of said motor in opposite directions, a spring biased reversing switch having forward, neutral and reverse positions, a control member operable to govern the shifting of said switch by its spring, means operable by said transfer means to set said switch in one of its positions against the action of its spring, means operable by said transfer means upon said control member to effect shifting of said switch to a second position, and means operable by said tone arm upon said control member to effect shifting of said switch from said second position to its third position.

9. In an automatic phonograph, the combination of a record magazine having means to support a plurality of records, a turntable, a tone arm adapted to operatively engage a record operatively positioned on said turntable, driving means for rotating said turntable, means operable in a loading movement in one direction to shift a selected record from the magazine to an operative position on said turntable and in an unloading movement in the opposite direction to return the record to said magazine, actuating means for reciprocating said record shifting means including a reversible driving motor, manual control means for initiating the loading movement, and a reversing switch for said motor controlled jointly by said tone arm and a moving element of said record shifting means for governing the movements of said record shifting means.

10. An automatic phonograph comprising, in combination, a tone arm, a vertically shiftable turntable, a first electric motor for rotating said turntable, a record magazine for storing a plurality of records, a transfer member having a loading and an unloading movement, said member being operable in its loading movement to engage a preselected one of said records to transfer the same from the magazine to a position over the turntable and operable in its unloading movement to restore the record to the magazine, a reversible electric motor having a driving connection with said transfer member, means having an element disposed in the path of the driving connection to said transfer member operated thereby as an incident to movement of said transfer member in its loading movement for elevating said turntable into engagement with the record placed thereabove, a switch controlling the energization of said first motor closed as an incident to the final loading movement of said member, a switch controlling the energization of said reversible motor opened as an incident to final loading movement of said member, and means under the control of the tone arm for initiating a withdrawal of said turntable and an unloading movement of said transfer member.

11. An automatic phonograph comprising, in combination, a tone arm, a vertically shiftable turntable, a first electric motor for rotating said turntable, a record magazine for storing a plurality of records, transfer means having a loading and an unloading movement, said means being operable in its loading movement to engage a preselected one of said records to transfer the same from the magazine to a position over the turntable and operable in its unloading movement to restore the record to the magazine, a reversible electric motor having a driving connection with said transfer means, means operable as an incident to the movement of said transfer means in its loading movement for elevating said turntable into engagement with the record placed thereabove, a manually actuated switch controlling the energization of said reversible motor to initiate a cycle of operation, and switch means controlled in part by said transfer means and in part by said tone arm, said switch means being actuated prior to engagement of the record with said tone arm to deenergize said reversible motor and energize said first motor and actuated when the record has been traversed by the tone arm to reenergize said reversible motor.

12. An automatic phonograph comprising, in combination, a tone arm, a vertically shiftable turntable, a first electric motor for rotating said turntable, a record magazine for storing a plurality of records, a transfer member having a loading and an unloading movement, said member being operable in its loading movement to engage a preselected one of said records to transfer the same from the magazine to a position over the turntable and operable in its unloading movement to restore the record to the magazine, a reversible electric motor, a screw rotated by said motor, means including a nut engaging said screw having a driving connection with said transfer member for reciprocating the same in accordance with movement of the nut along the screw, a manually closable switch for energizing said reversible motor to initiate a cycle of operation, and means actuated by said nut for shifting said turntable vertically to elevate the record positioned thereabove into engagement with said tone arm, and switch means actuated by said nut for controlling said motors.

CARL E. FAUST.